UNITED STATES PATENT OFFICE.

THOS. HOOKER AND WM. D. BEAUMONT, OF NEW ORLEANS, LOUISIANA, ASSIGNORS TO A. A. PRAY, N. M. HARRIS, E. C. LEMOYNE, J. R. JENNINGS, G. G. KIRK, AND L. A. KIRK, ALL OF SAME PLACE.

IMPROVEMENT IN ARTIFICIAL FUEL.

Specification forming part of Letters Patent No. 12,847, dated May 8, 1855.

*To all whom it may concern:*

Be it known that we, THOMAS HOOKER and WILLIAM D. BEAUMONT, of the city of New Orleans, parish of Orleans and State of Louisiana, have discovered or invented a new Article of Fuel, by us called "Firmamentum" in the caveat now on file in the secret archives of the Patent Office; and we do hereby declare that the following is a full and complete description of all the component parts and the manner of combining them.

Take one hundred and forty parts of any of the known formations of earth, thirty parts of common lime, twenty parts of the dust or refuse of coal, two parts of clinkers or iron dust, three parts of common rosin or pitch, two parts of carbonate of ammonia, eight parts of sawdust or chips. The aforesaid are to be thoroughly mixed. Water of any kind can be used, so as to soften the materials to about the consistency of clay-mortar, from which bricks are manufactured.

The form in which the firmamentum is made is a mere matter of fancy. We usually make it into balls, and under the ingredients mentioned as sawdust and chips we include bagasse, it being abundant in many localities, and answering a very excellent purpose.

Having thus fully described the nature of our invention, what we claim therein as new, and desire to secure by Letters Patent, is—

The manufacture of a new article of fuel composed of lime, fine coal, clinkers, rosin, carbonate of ammonia, and bagasse, or their equivalents, mixed in the proportions substantially as herein set forth.

THOMAS HOOKER.
WM. D. BEAUMONT.

Witnesses:
JOHN G. POINDEXTER,
D. M. HARRIS.